(12) United States Patent
Zhang et al.

(10) Patent No.: US 8,255,516 B1
(45) Date of Patent: Aug. 28, 2012

(54) PERFORMANCE-DATA BASED SERVER CONSOLIDATION

(75) Inventors: Alex X. Zhang, San Jose, CA (US); Fereydoon Safai, Los Altos Hills, CA (US); Dirk M. Beyer, Walnut Creek, CA (US); Jerome Rolia, Kanata (CA); Marie-Jo L. Fremont, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1719 days.

(21) Appl. No.: 11/413,349

(22) Filed: Apr. 28, 2006

(51) Int. Cl.
*G06F 15/173* (2006.01)

(52) U.S. Cl. ........ 709/224; 709/223; 709/203; 709/206; 709/226; 707/100; 707/101

(58) Field of Classification Search ............. 709/224
See application file for complete search history.

(56) References Cited

U.S. PATENT DOCUMENTS

| | | | |
|---|---|---|---|
| 6,148,335 A * | 11/2000 | Haggard et al. | 709/224 |
| 6,260,020 B1 | 7/2001 | Ruffin et al. | |
| 7,506,361 B2 * | 3/2009 | Kegel et al. | 726/3 |
| 2002/0140743 A1 | 10/2002 | DeLuca et al. | |
| 2003/0225563 A1 | 12/2003 | Gonos | |
| 2004/0034577 A1 | 2/2004 | Van Hoose et al. | |
| 2004/0167906 A1 * | 8/2004 | Smith et al. | 707/100 |
| 2006/0173875 A1 * | 8/2006 | Stefaniak | 707/101 |
| 2006/0179171 A1 * | 8/2006 | Stefaniak et al. | 710/15 |
| 2006/0282825 A1 | 12/2006 | Taylor | |
| 2007/0028239 A1 * | 2/2007 | Dyck et al. | 718/1 |
| 2007/0094375 A1 * | 4/2007 | Snyder et al. | 709/223 |
| 2007/0226341 A1 | 9/2007 | Mateo | |
| 2007/0255814 A1 * | 11/2007 | Green et al. | 709/223 |

* cited by examiner

*Primary Examiner* — Hua Fan

(57) ABSTRACT

A method for server consolidation is provided. The method includes accessing performance data of a plurality of source servers, receiving multiple consolidation parameters for a desired target server, receiving selected configurations for a new target server, computing a minimum number of target servers required to consolidate the plurality of source servers based at least on the performance data, the selected configurations for the desired target server, and the multiple consolidation parameters, and deriving a bin-packing solution to the server consolidation based at least on the performance data, the selected configurations for the new target server, and the minimum number for the one or more performance metrics.

19 Claims, 8 Drawing Sheets

PERFORMANCE-DATA BASED SERVER CONSOLIDATION

CROSS-REFERENCE

This application is related to U.S. patent application Ser. No. 11/412,347, entitled, "SERVER CONSOLIDATION" filed on Apr. 27, 2006, which is herein incorporated by reference in its entirety.

BACKGROUND

Businesses are interested in consolidating software applications that run on individual, often under-utilized, servers onto a smaller number of more highly used ones. Such server consolidation is difficult to do as many technological and business factors need to be taken into account and large numbers of servers are typically involved. For example, relatively common consolidation projects typically involve the consolidation of a few hundred servers. The amount of performance data involved in analyzing server utilization and identifying performance bottlenecks is staggering, causing many users to rely only on summarized performance data (such as average or peak CPU utilization) for the analysis. However, such simple summarized data does not reflect the time-dynamic nature of the system performance and leads to overly conservative consolidation plans. For example, using a single CPU utilization number implicitly assumes that workload peaks across servers occur exactly at the same time, which is not a realistic assumption and negates the value of sharing workloads that are complementary in their time and resource usage patterns.

BRIEF DESCRIPTION OF THE DRAWINGS

Embodiments are illustrated by way of example and not limited in the following figure(s), in which like numerals indicate like elements, in which.

DETAILED DESCRIPTION

Figure 1:
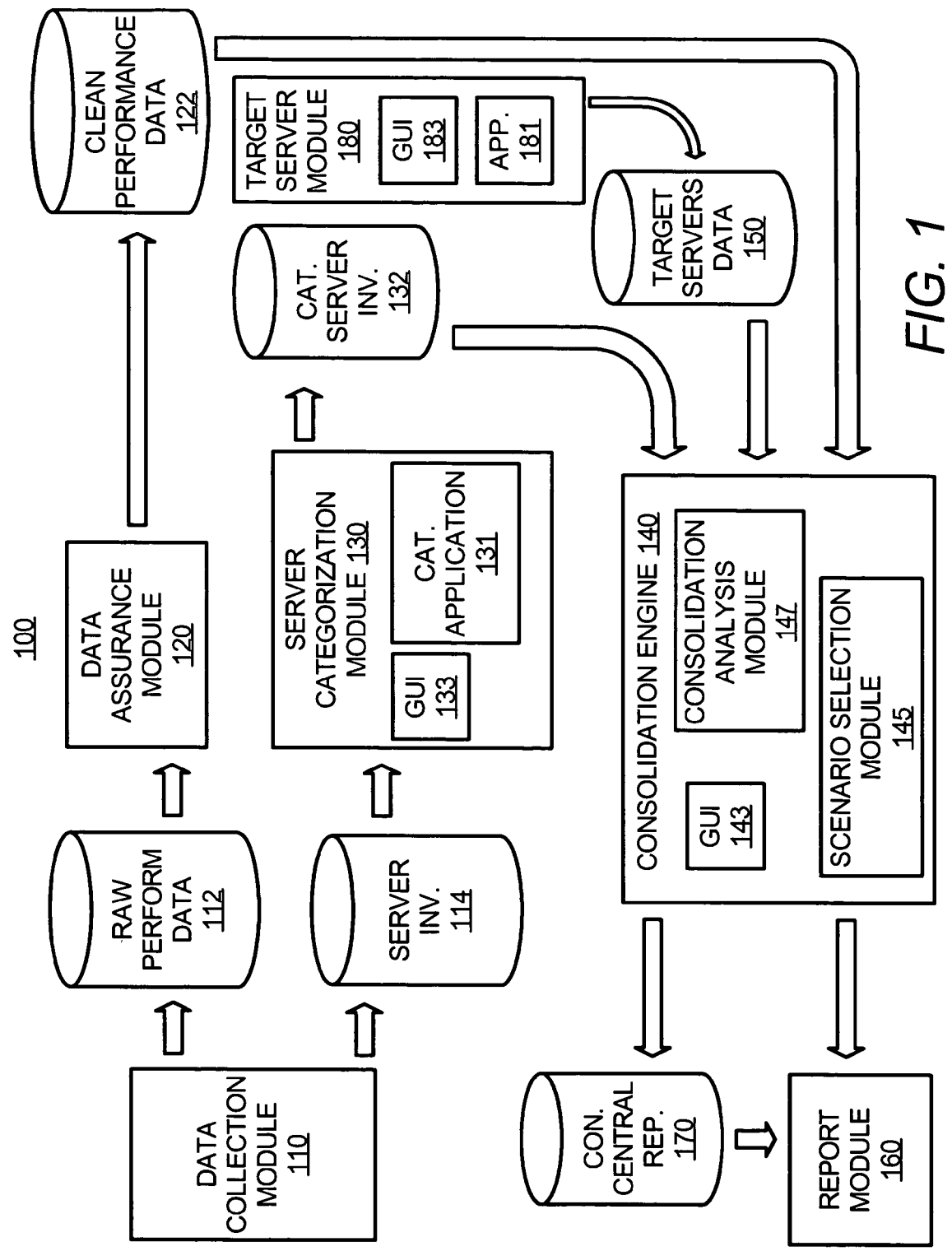
FIG. 1 illustrates a high-level architecture 100 for server consolidation, in accordance with one embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Methods and systems for providing a systematic and consistent approach for consolidating servers and server consolidation services are described herein. Conventional solutions for server consolidation vary from simple rules of thumb to complex consolidation tools. Rules of thumb typically lack consistency and thoroughness and typically overlook performance data or issues. Existing consolidation tools, such as CapacityPlanner software from VMware of Palo Alto, Calif., usually do not provide much assessment of data or performance issues that may have existed and lack flexibility in terms of the consolidation analyses a user potentially wants to conduct. Also, existing consolidation tools do not offer seamless integration across data quality assessment, analysis, and results. Furthermore, conventional server-consolidation solutions typically employ bin-packing procedures that limit server consolidation analyses to one performance constraint at a time, or dimension, and simply report the other performance metric values, which are not considered in the consolidation plan. For example, conventional bin-packing procedures commonly studied in the operations research and computer science fields deal with very few dimensions, such as, five dimensions (length, width, height, weight, and dollar value) for "truck-loading" problems in the operations research field, and two dimensions (time and memory) for "strip-packing" (job scheduling involving CPU and memory demands) in the computer science field. Furthermore, conventional bin-packing procedures apply a rigid treatment of bin capacities in that any bin capacity limit must be completely satisfied.

Accordingly, embodiments described herein address at least some of the aforementioned problems with the prior art. As referred herein, a server is a computer, or any processor-based device, or a network of computers. Examples of a server include but are not limited to a desktop computer, a laptop computer, a mainframe computer, a networked computer, a processor-based device, or any similar types of systems and devices. Thus, a server potentially includes one or more processors of any of a number of computer processors, such as processors from Intel, Motorola, AMD, Cyrix. Each processor is coupled to or includes at least one memory device, such as a computer readable medium (CRM). The processor is operable to execute computer-executable program instructions stored in the CRM, such as program code of applications, to run the applications. The computer-executable program instructions include code from any suitable computer-programming language, such as C, C++, C#, Java, or the like. Embodiments of a CRM include, but are not limited to, an electronic, optical, magnetic, or other storage or transmission device capable of providing a processor of the server with computer-readable instructions. Other examples of a suitable CRM include, but are not limited to, a floppy disk, CD-ROM, DVD, magnetic disk, memory chip, ROM, RAM, an ASIC, a configured processor, any optical medium, any magnetic tape or any other magnetic medium, or any other medium from which a computer processor can read instructions.

In one embodiment, there is provided a server consolidation tool that is operable with any data collectors, wherein it is possible to conduct data analyses in the user's environment. In another embodiment, a server consolidation tool is provided to the user with a combined checklist (or summary) and navigator with a graphical user interface (GUI) to enable the user to achieve server consolidation with the desired quality and consistency. Other embodiments offer users a high degree of flexibility in server consolidation by allowing the users to skip steps, come back to a step, choose a singular or plural forms (for example, in one or more selected groups of servers, scenarios, and consolidation constraints), and select numerous options and choices in the process. Users are also offered choices in defining groups and scenarios, designating servers as Replace, Reuse, Undecided (or don't know), and Unchanged (or don't touch), and articulating consolidation constraints and many other key elements of the analysis as described later. In one embodiment the user gets results back through reports. In another embodiment the user has direct access to data in a repository for data mining and creating further reports. As referred herein, users are IT consultants, IT managers, system administrators, or any other entities that are interested in consolidating servers, rebalancing workloads of the servers, planning future server capacity, or providing server consolidation services with any combination of the first three.

FIG. 1 illustrates a high-level system architecture 100 for server consolidation in accordance with one embodiment. However, alternative embodiments of server consolidation that operate with different systems are contemplated, as understood from the present disclosure. In FIG. 1, one or more data collectors are employed for the data collection module 110. In one embodiment, a data collector is one or more software programs, applications, or modules. As referred herein, a software program, application, or module includes one or more machine-coded routines, objects, components, data structures, and the like that perform particular tasks or implement particular abstract data types. The data collectors are used to discover and inventory those servers within a desired environment that need to be consolidated and to collect raw performance data of such servers (hereinafter, "source servers"). For example, a desired environment is the entire information technology (IT) infrastructure of a company, and the servers that are detected and inventoried are those that are parts of or belong to such IT infrastructure. As referred herein, information technology, or IT, encompasses all forms of technology, including but are not limited to the design, development, installation, and implementation of hardware and software information systems and software applications, used to create, store, exchange and utilize information in its various forms including but are not limited to business data, conversations, still images, motion pictures and multimedia presentations technology and with the design development, installation, and implementation of information systems and applications.

In one embodiment, the data collectors are used to discover and inventory desired source servers, determine existing workloads that are handled by such source servers, and record the existing workload on each of the source servers in a performance log (hereinafter, "trace") over a predetermined data collection period, such as two months prior to the running of the consolidation analysis. The performance logs, or traces, include time-series or time-stamped data with one or more data points, such as 10,000 or more, in each data series or set. For example, 1 month of data collection period with 5-minute collection interval leads to (1 month)(30 days/month)(24 hours/day)(60 minutes/hour/5 minutes)=8,640 time intervals, or 8,640 data points for each user-defined performance metric of a source server, such as CPU utilization or physical memory used, as further described later.

As discussed earlier, in contrast to prior art consolidation tools, it is possible to employ any known data collector or collectors for the data collection module 110 because of the flexibility of the server consolidation architecture 100 to independently operate with any and all data collectors, so long as the collected data is collected appropriately by the data collector for input into the server consolidation tool. Examples of possible data collectors include but are not limited to: HP Asset and OpenView softwares from Hewlett Packard Company of Palo Alto, Calif., BMC Discovery Express from BMC Software, Inc. of Houston, Tex.; and those data collectors available in the VMware CapacityPlanner software and CDAT software from IBM Corporation of Amonk, N.Y.

Referring back to FIG. 1, the inventory 114 of the source servers and the raw performance data 112 are processed separately, wherein the raw performance data 112 is subjected to cleaning by the data assurance module 120, and the server inventory 114 is subjected to processing by the server categorization module 130. In one embodiment, data assurance is automatically performed by the data assurance module 120, which is one or more software programs, applications, or modules. In an alternative embodiment, data assurance is performed manually by a user reviewing the collected raw performance data based on predefined data assurance rules (for example, specifying data conditions that are considered abnormal performance) and deciding to include or exclude servers in the consolidation based on data or performance issues gathered from the review.

In one embodiment, the data assurance module 120 is desirable because in practice, a number of imperfections exist in the collected raw performance data 112, and such imperfections affect the quality of consolidation analyses and recommendations. Thus, in one embodiment, the data assurance module 120 at least checks the raw performance data 112 for a predefined set of imperfections, corrects at least some of the imperfections in the raw performance data, and generates clean performance data 122 of sufficient quality for use in server consolidation. In another embodiment, the data assurance module 120 further deals with missing data, extra data, time synchronization, and outliers (values that are outside the expected range of a metric), for example, by excluding any server from consolidation that has too much missing data, extra data, or outliers, and by aligning different time stamps on data for time synchronization. Also, the data assurance module 120 is operable to report abnormal server behaviors to the user so as to provide the user an opportunity to exclude those servers with abnormal behavior from the consolidation analysis. Examples of abnormal server behaviors include but are not limited to: a server that does not always report utilization data, a server that reports too much data, a server that reports maximum utilization of a particular resource for a sustained period of time (such as 100% server memory utilization for 60 minutes). Thus, abnormal behaviors are predefined (such as those behaviors due to missing data, extra data, outliers, or latent demand) and subsequently modifiable as desired or needed. Accordingly, the data assurance module 120 provides the user an opportunity to examine information regarding the quality of the cleaned and non-cleaned performance data that has been collected. By seeing data or performance issues on the existing source servers, the user not only obtains a performance diagnosis of the current systems but also gains a level of confidence about the quality of the consolidation analyses that are to be conducted on the performance data. As the clean performance data 122 is collected, it is fed to the consolidation engine 140. Alternatively, the clean performance data 122 is saved in an accessible storage space, such as a database, for access by the consolidation engine 140 as needed for desired.

At the server categorization module 130, the server inventory 114 is processed for further categorization to generate a categorized server inventory 132. In one embodiment, the server categorization module 130 is implemented by one or more categorization software programs, applications, or modules 131, wherein the user is provided with a graphical user interface (GUI) 133 to select predetermined fields of criteria or filters for the server categorization or fill in additional categorization fields as desired or needed for the server categorization to select source servers for consolidation. Alternatively, the GUI 133 is operable to allow the user to select individual source servers from a list in the server inventory 114 for consolidation. Thus, as referred herein, those tasks or functions performed by the server categorization 130 are performed by the underlying categorization software application. Furthermore, any interactions between server categorization module 130 and users are done via the GUI 133.

At target server module 180, data relating to the user-selected target platform for new servers to be used for server consolidation (hereinafter, "target server" or "consolidated server") is generated. Thus, as a referred herein, a "new" target server refers to an added server that satisfies the user-selected target platform and is not one of the source servers inventoried by the data collection module 110. In one embodiment, the target server module 180 includes one or more software programs, applications, or modules 181, wherein the user is provided with a GUI 183 to allow the user to select a target hardware or platform from a list of candidate server models for new target servers potentially used in the server consolidation. Alternatively, the user relies on automated, predetermined policies, as programmed in the software application 181, to select a target platform from a list of candidate server models based on the user's input of one or more conditions. For example, the user specifies one or more criteria for selecting a target platform, such as selecting a target platform based on power specifications. The selected target platform and its characteristics are output as the target server data 150. In one embodiment, the GUI 183 of the target server module 180 is integrated with the GUI 143 of the consolidation engine 140. Alternatively, the GUI 183 is separate and distinct from the GUI 143.

The clean performance data 122, the categorized server inventory data 132, and the target server data 150 are fed into a consolidation engine 140, which is used to further define and analyze one or more proposed server consolidation scenarios, as will be described later. According to one embodiment, the consolidation engine 140 includes a scenario selection module 145 and a consolidation analysis module 147 that interface with users via a GUI 143. In one embodiment, each of the modules 145 and 147 includes one or more software programs, applications, or modules. The GUI 143 is menu-based or screen-based to display different menus or screens (for example, web pages) to allow different inputs from users for various server consolidation tasks performed by the underlying modules 145 and 147. For example, the GUI 143 is operable to allow the user to select a particular consolidation algorithm and set optional input parameters with the selected algorithm such as the initial number of new servers. Thus, as referred herein, those tasks or functions performed by the consolidation engine 140 are performed by the underlying modules 145 and 147, and any interaction between the consolidation engine 140 and users is done via the GUI 143. The server consolidation process and tasks are further described in the aforementioned U.S. application Ser. No. 11/412,347, which is herein incorporated by reference in its entirety.

The results of the consolidation analysis is output from consolidation engine 140 to a report software module 160 for the generation of reports for the user to review. The results are also saved in a consolidation central repository 170, such as a CRM, for future reference. The goal of the consolidation analysis is to determine a minimal number of consolidated servers that is capable of handling all workloads that are running on the user-defined selected source servers and satisfying all user-defined consolidation constraints.

According to one embodiment, the scenario selection module 145 prompts the user to select or create one or more consolidation scenarios (hereinafter, "scenarios") to run for a consolidation analysis of the user's selected group or groups of source servers. For each scenario, the scenario selection module 145 also prompts the user to mark or assign each server in the selected group (or groups) of source servers with one of four statuses: Replace, Reuse, Undecided, and Unchanged. A Replace status indicates that the server is to be removed from use as a target (or consolidated) server for the server consolidation. A Reuse status indicates that the server is to be used as a target server subsequent for the server consolidation. Any workload (for example, application programs) currently running on a Reuse server remains on the Reuse server. An Undecided status indicates that the server is to serve as a Replace or Reuse server as necessary (for example, as a Reuse server before any new server is used for the consolidation; otherwise, as a Replace server). An Unchanged status indicates that the server is beyond the scope of the server consolidation and excluded from such consolidation because of some predetermined conditions, such as technical reasons, security reasons, policy mandates, or lack of data. A server is marked as Unchanged either by the user, if the user has knowledge that the server is beyond the scope of the server consolidation, or automatically by the server categorization module 130 based on those predetermined conditions relating to data quality assessment that have been programmed therein.

With the scenario selection module 145, the user is free to mark the selected servers based on any desired criteria, including but not limited to server characteristics (such as model, processor power or speed, server age, etc.) and operational decisions (such as migration to a different operating system or platform). In one embodiment, by default, all servers in a selected group for server consolidation are initially marked as Replace. However, such markings are changeable by the user via the GUI 133. For example, the GUI 133 enables the user to sort and mark the servers based on a few desired parameters, such as server model, number of CPUs, CPU speed, memory, lease expiration date, etc. In another example, the GUI 133 enables the user to select and mark individual servers from a list, wherein the GUI 133 allows the user to drag and drop into, or mark the servers as, one of four aforementioned statuses. The markings are saved by the scenario selection module 145 in, for example, a CRM in the consolidation engine 140, for the selected group of servers.

It should be noted that, as used herein, the names "Replace," "Reuse," "Undecided," and "Unchanged" are merely used to identify and differentiate the four different statuses that mark the selected servers for consolidation. Thus, alternative embodiments are contemplated wherein different names are used for the four statuses (for example, first status, second status, third status, and fourth status) without deviating from the meanings of the four statuses as described herein.

For servers that have been marked Undecided, the scenario selection module 145 further determines whether those Undecided servers ultimately should be Replaced or Reuse as necessary, based on predetermined policy considerations. For example, an Undecided server is determined to be Replaced if it is possible to accommodate the server's workloads by other servers in the group that have been marked as Reuse. On the other hand, an Undecided server is determined to be Reuse if the already-marked Reuse servers are inadequate to host the workloads of the Undecided server and one or more new servers from the target server data 150 are then required to replace the Undecided server. Alternative embodiments are contemplated, wherein the Undecided servers are determined to be Replaced or Reuse based on other predetermined policy considerations, such as "Use newer systems first," "Use most powerful servers first," "Use servers in Data Center A first," etc.

Once the Undecided servers are determined to be Replaced or Reuse, to further define the scenario being created, the scenario selection module 145 prompts and receives from the user a selection of one or more consolidation constraints on the consolidated servers, which include, in combination or alternatively: one or more new servers from the target platform, as provided by the target server data 150, Reuse servers as marked from the categorized server inventory 132, and those Undecided servers that are determined to be Reuse at 255. Thus, the selected constraints apply to all servers (Replaced, Reuse, Undecided) except for the Unchanged ones.

In one embodiment, the GUI 143 allows the user to enter desired values for one or more fields in a consolidation constraint. Each consolidation constraint includes at least four consolidation parameters or fields: a performance metric definition a, a time interval aggregation method or function for each defined performance metric, a performance constraint, capacity, or limit C for each defined performance metric, and a probability goal a for satisfying the performance limit. Examples of a performance metric definition include but are not limited to: CPU utilization, physical memory used, disk operations per second, and network Input/Output (I/O) bytes per second. Examples of a time interval aggregation method or function for each defined performance metric include but are not limited to: 5-minute average, 5-minute maximum, 5-minute snapshot, and 1-hour average. Examples of a performance constraint or limit C(a) for each defined performance metric include but are not limited to: 65% of CPU utilization and 95% of physical memory used. Examples of a probability goal for satisfying a performance limit in each defined performance metric include but are not limited to: 0.95, 0.99, and 1. The probability goal, which is not provided in existing consolidation tools, is an important field in the consolidation constraint because it enables the user to set a desired efficiency level for the consolidated servers. Thus, examples of consolidation constraint include but are not limited to: CPU utilization 5-minute average≦65% with a probability of 0.99, CPU utilization 1-hour average≦50% with a probability of 1, and physical memory used 5-minute snapshot≦2,048 megabytes (MB) with a probability of 1. Accordingly, the user is free to enter any performance metric (CPU, memory, disk I/O, network I/O) for which there is historical data, any time interval (5-minute, 15-minute, 1-hour, 1-day, etc.), any aggregation function (average, maximum), any limit, and any probability goal. In one embodiment, the user is able to refer to the current averages for the selected metrics for those current source servers as guidelines to setting consolidation constraints on the consolidated servers.

According to one embodiment, the consolidation analysis module 147 employs a bin-packing process for consolidation analysis by modeling each selected source server as an "object" and each consolidated or target server as a "bin" (new or reused). Thus, the bin-packing process is employed to pack objects into bins with as few bins used as possible. By regarding each user-defined performance metric in each interval as a dimension of the bin, the bin-packing process provides a solution to a multi-dimensional bin-packing problem that includes the following aspects: high dimensionality, dimensional subsets, probabilistic bin capacities, and multiple bin capacity constraints with different time interval aggregates. Each of these aspects is described below.

Regarding high dimensionality, because each consolidation constraint such as "CPU Utilization 5-minute average 65%" applies to all time intervals, the dimensionality as defined in the conventional bin-packing is equal to:

(number of consolidation constraints)×(number of time intervals).

For example, if there are two consolidation constraints, and 10,000 time intervals (with 5 minutes per time interval, 10,000 time intervals are approximately 35 days), then the bin-packing problem includes 20,000 dimensions. An example with 3 performance metrics, CPU utilization, physical memory used, and network I/O, and 10,000 intervals, and hence 30,000 dimensions, is shown below:

CPU t=1
CPU t=2
. . .
CPU t=10,000
Memory t=1
Memory t=2
. . .
Memory t=10,000
Network t=1
Network t=2
. . .
Network t=10,000.

Regarding dimensional subsets, each defined performance metric is a subset of the total dimensionality of the bin-packing problem. The dimensions are grouped by the performance metrics such as CPU utilization, physical memory used, and network I/O.

Regarding probabilistic bin capacities, the conventional bin capacity is fixed and cannot be exceeded, that is, if the bin capacity is to exceed in any dimension, a new bin is opened. In one embodiment of the bin-packing process, it is desirable to have flexible bin capacities in that the bin-capacity limit is operable to have a user-specified probability goal a, such as 65% in CPU utilization for most but not all of the time intervals. Additionally, there is provided allowance for an occasional violation of the bin-capacity limit, such as in the case of a sudden, temporary and unpredictable spike in resource usage, as long as the violation occurs infrequently as defined by a probabilistic goal such as "violations occur in less than 0.1% of all the time intervals." Thus, it is possible to define, for example, a bin-capacity limit of 65% in CPU utilization with a probability goal of 99.9%, in other words, with 0.1% chance for violations. Accordingly, it is possible to define the conventional fixed bin capacity as a probabilistic bin capacity having a probability goal of 100%. Furthermore, it is possible to define a probabilistic bin capacity for each consolidation constraint, that is, each dimensional subset, which allows even greater flexibility in business application. For example, it is possible for a user to enter a probabilistic goal of 99.5% for CPU utilization limit of 65% (based on 5-minute averages), but a higher probabilistic goal of 99.9% for CPU utilization limit of 50% based on 1-hour averages, and an even higher probabilistic goal of 100% for a physical-memory-used limit of 2 GB.

Regarding multiple bin capacity constraints with different time interval aggregates, according to one embodiment, having time as a main aspect of the dimensionality provides the bin-packing process with the flexibility to "compress" time. For example, with a trace data collection of average CPU utilization on 5-minute intervals for 35 days (which totals approximately 10,000 intervals of 5 minutes each), it is possible to have two consolidation constraints, such as "CPU utilization based on 5-minute averages not exceeding 65% with probability 0.995" and "CPU utilization based on 1-hour averages not exceeding 50% with probability 0.999." Both of the aforementioned consolidation constraints are based on the same trace data (5-minute average CPU utilization), whereby the second constraint (1-hour averages) is a time-compressed or aggregated metric that is derived from the based trace data by averaging the 12 data points, each being a 5-minute average, into the 1-hour average.

The bin-packing process as performed by the consolidation analysis module 147 is now described with reference to the process flow illustrated in FIG. 2, with further reference to FIG. 1. This process, or any part thereof, is potentially performed by users who are, for example, in-house IT personnel in an organization wishing to consolidate the organization's IT assets, IT consultants providing consolidation services to their customers, or a combination of both in-house IT personnel and outside IT consultants.

At 210, the bin-packing process 200 begins with the consolidation analysis module 147 accessing or reading trace data w(i, a, t) for each trace w from the clean performance data 122, for source servers i=1, 2, ..., n, performance metrics a=1, 2, ..., K for each source server i as predetermined or predefined by the user, and time intervals t=1, 2, ..., T for measuring each performance metric a, where n, K, and T are any user-defined integers, in a selected consolidation scenario provided by the scenario selection module 145. Thus, the trace data is specified for each source server (as obtained from the categorized server inventory 132), each performance metric, and each interval. In one embodiment, the clean performance data 122, including the trace data therein, is stored on a relational database in the data assurance module 120. In another embodiment, the clean performance data 122 is stored in one or more flat files having comma separated values (csv) format, plain text, or spreadsheet format, wherein the trace data for each source server is stored in each flat file. Reading the trace data is accomplished by a SQL query, or by loading the trace data file into memory, with adjustment for workload growth and virtualization overhead.

At 220, the consolidation analysis module 147 reads user-defined consolidation constraints for the bin capacities C(a) and probability goals α(a), for the performance metrics a=1, 2, ..., K for a desired target server platform, and marked statuses of those source servers selected for consolidation, as obtained by the scenario selection module 145 for a user-selected consolidation scenario. Thus, for each performance metric a, the user is able to enter a bin capacity limit C, such as 65%, and a probability goal α, such as 0.995, for the bin capacity C of each particular performance metric α.

At 230, the consolidation analysis module 147 next reads the user-selected new target server configuration, such as CPU type, count, speed, etc., from the target server data 150, which is obtained from the target server module 180. In one embodiment, the new target server specification includes CPU type (such as "Itanium II"), CPU count (such as 4 CPUs), CPU speed (such as 1600 MHz), server brand and model, and optionally the number of processor cores (such as 2 cells). The new target server specification establishes a "unifying" server speed, or server transactions per minute (TPM), so that all other servers are normalized with relative speeds based on the new target server TPM. This is desirable because, for example, a workload consuming 10% CPU utilization on a source server consumes only 5% on a new target server if the new target server is twice as fast as the source server. If the target servers are all Reuse servers, each of the Reuse servers is also normalized with a relative speed based on the new target server TPM. Thus, for each source server i, a "server speed factor" is defined as the server TPM rating of server i relative to that of the "unifying" server TPM of the new target server, or:

$$\text{SpeedFactor}(i) = \text{ServerTPM}(i)/\text{ServerTPM}(\text{new target server}).$$

With the above conversion factor, the CPU utilization on the new target server is related to the CPU utilization on an existing source server i in the following relationship (for any interval t):

$$(\text{CPU utilization on new target server}) = \text{SpeedFactor}(i) \times (\text{CPU utilization on Server } i).$$

It should be noted that this SpeedFactor( ) applies to performance metrics that are related to CPU raw power, such as CPU utilization. However, it is possible to generalize the concept of a speed factor to other performance metrics as well. For example, a SpeedFactor( ) that applies to available physical memory is always equal to 1 because one byte of memory on one server translates to one byte of memory on any other server. Thus, in general, a Speed Factor( ) is defined as follows:

$$\text{SpeedFactor}(i,a) = \text{ServerTPM}(i)/\text{ServerTPM}(\text{new target server}), \text{ if performance metric } a \text{ is related to CPU power;}$$

$$= 1, \text{ if performance metric } a \text{ is not related to CPU power.}$$

For the relative speed of two existing servers, for example, source server i to target server j, the ratio (of two ratios) SpeedFactor(i, a)/SpeedFactor(j, a) is simply used. Thus, the generalized SpeedFactor(i, j, a) allows conversion of metric values between any two servers on any performance metric a. The generalized SpeedFactor is used, for example, when a Replace server i is to be consolidated into a Reuse server j.

Referring back to FIG. 2, at 240, based on the trace data read at 210, the consolidation analysis module 147 generates trace data for any performance metric that specifies an aggregated time interval (such as 1-hour). For example, the user decides to enter a performance metric such as "CPU utilization on a 1-hour average basis should not exceed 50% with probability 1." In such a case, the time interval specified for the performance metric is 1-hour, while the time interval in the trace data may be 5 minutes. An aggregation step is then performed, whereby each set of 12 data points (12=1 hour/5 minutes) is averaged into an hourly average. Thus, if the original trace data contains 10,000 data points (one data point for each 5-minute interval), then the aggregation provides 10,000/12=833 (rounding down) new data points, which are to be associated with the 1-hour metric.

At 250, the consolidation analysis module 147 computes the lower bound, LB, on the minimum number of target servers required after consolidation, wherein the lower bound refers to the minimum number of servers, including the user-designated Reuse servers and new servers but excluding Undecided servers, required to satisfy each and all performance constraints that the user has defined, given the trace data. Thus, for example, a lower bound of 4 target servers indicates that at least 4 target servers are required after consolidation. In the case of a heuristic, or approximate, solution to the bin-packing problem, the computed lower bound indicates the quality, that is, how good or bad, of the solution to the bin-packing problem. For example, a solution that far exceeds the lower bound is indicative of a poor solution that calls for many more servers than necessary. In the case of a mathematical optimization solution, it is possible to use the lower bound in any known branch-and-bound numerical solution process to increase the speed and efficiency in the search for the optimal solution.

According to one embodiment, the consolidation analysis module 147 provides computation of a lower bound that is as close to the true optimal number of servers as possible. FIG. 3 illustrates further details of the lower bound computation at 250. At 310, the consolidation analysis module 174 determines whether there are servers marked as Reuse from those source servers selected for consolidation (as found at 220, FIG. 2). At this juncture, any source server marked as Undecided is disregarded. If there is no Reuse server, at 320, the total workload of the selected source servers for each performance metric a is computed as follows:

$$W(a, t) = \sum_{i=1}^{n} SpeedFactor(i, a) \cdot w(i, a, t),$$

over t=1, 2, . . . , T (summing across the n servers before consolidation and adjusting for relative speed factors of different servers). Next, at 322, let the 100α-percentile of the total workload W(a, t) over t=1, 2, . . . , T, with fixed a, be:

$$p(a) = q_{t=1, 2, \ldots, T}(W(a,t), \alpha(a)).$$

As referred herein, 100α-percentile indicates the product of 100·α so as to convert the probability goal a to a percentile value. Accordingly, the 100α-percentile of the total workload W(a, t) refers to a percentage of the total workload W(a, t) that is computed from applying the probability goal a to the total workload W(a, t). At 324, a lower bound on the number of bins (new target servers) required is computed as:

$$LB = \max_{a=1,2,\ldots,K} LB(a) = \max_{a=1,2,\ldots,K} \lceil p(a)/C(a) \rceil$$

where ⌈x⌉ denotes the smallest integer that is greater than or equal to the number x (that is, fractional values are always rounded up).

To validate the above LB expression of the lower bound, consider any single performance metric a. Thus, for any number of bins that pack all the n objects, this number of bins must at least cover α(a)·T of the T intervals. If the number of bins is less than p(a)/C(a), then it is certain that these bins are not able to cover α(a)·T intervals. Now, because the number of bins must be an integer, the above LB expression is used in order to "cover" the performance metric a. Because all performance metrics a=1, 2, . . . , K are to be satisfied, it is possible to choose one of these performance metrics that results in the maximum LB(a), which then becomes the computed lower bound value.

If there is at least one Reuse servers as determined at 310, the above LB expression is modified through a bounding procedure, wherein at 330, the total workload of the selected source servers for each performance metric a is computed as follows:

$$W(a, t) = \sum_{i=1}^{n} SpeedFactor(i, a) \cdot w(i, a, t),$$

over t=1, 2, . . . , T (summing across the n servers before consolidation and adjusting for relative speed factors of different servers). Next, at 332, the 100α-percentile of the total workload W(a, t) over t=1, 2, . . . , T, with each fixed a, is computed as follows:

$$p(a) = q_{t=1, 2, \ldots, T}(W(a,t), \alpha(a)).$$

At 334, known aggregate capacities of the Reuse servers are subtracted from the above 100α–percentile, p(a). At 336, if the result is determined to be zero or negative, then at 3362, such result indicates that the Reuse servers are capable of handling all the traces on the metric a, no new servers are needed, and at 3362, the lower bound on the metric a is simply the number of Reuse servers. At 336, if the result is determined to be positive, such result indicates that the Reuse servers are not capable of covering all the traces on the metric a, and new servers are needed. The number of new servers needed is equal to the resulting percentile (after subtracting the known aggregate capacities of the Reuse servers at 334) divided by the limit of the new target server in the performance metric a, that is, C(a). Accordingly, at 3364, the lower bound returned is equal to the sum of the new servers and the Reuse servers.

The aforementioned lower bound computation procedure is repeated for each performance metric a. The overall lower bound value is the maximum LB value of lower bounds over all performance metrics a, wherein the performance metric a that yields the highest lower bound is most likely to be the critical (bottleneck) performance metric in the consolidation. The lower bound for each performance metric a is called a "Minimum Metric Support," which is the minimum number of bins that are needed to support the user defined metric (with the metric limit and the probability goal), notwithstanding all other metrics.

Referring back to FIG. 2, at 260, the consolidation analysis module 147 proceeds to solve the bin-packing problem, that is, deriving the bin-packing solution. In one embodiment, a mathematical optimization method using an integer programming formulation is used to solve the bin-packing problem, which is explained later. In an alternative embodiment, first-fit decreasing and best-fit decreasing heuristics are used to solve the bin-packing problem, which is also explained later with reference to FIGS. 4-6.

At 270, the consolidation analysis module 147 reports the bin-packing solution to the report module 160. The bin-packing solution includes two numerical elements: 1) the number of bins (target servers) after consolidation; and 2) the before-and-after consolidation assignment. The second numerical element specifies how the existing source servers are to be consolidated, and it is represented by a vector array:

BinAssignment(server-before-consolidation)=server-after-consolidation. For example, 5 existing source servers, Server 1, Server 2, Server 3, Server 4, and Server 5 (where Server 5 is to be Reuse), are to be consolidated. The bin-packing solution may be: 1) 2 target servers are needed; and 2) the assignment vector array is:

BinAssignment(Server 1)=Server 5;
BinAssignment(Server 2)=New Server 1;
BinAssignment(Server 3)=New Server 1;
BinAssignment(Server 4)=New Server 1;
BinAssignment(Server 5)=Server 5.

In this case, Server 5 is to further accept the old workloads from Server 1. The other three servers, Server 2, Server 3, and Server 4 are migrated to a new server, New Server 1. The report module 160 is operable to display the recommended consolidation plan in a tabular format that is easy to understand and easy to act upon. The report module 160 is also operable to show performance prediction (such as the high watermark, that is, peak performance) and performance summary (such as the average watermark, that is, average performance) on each user-defined performance constraint for each target server after the consolidation.

Figure 2:
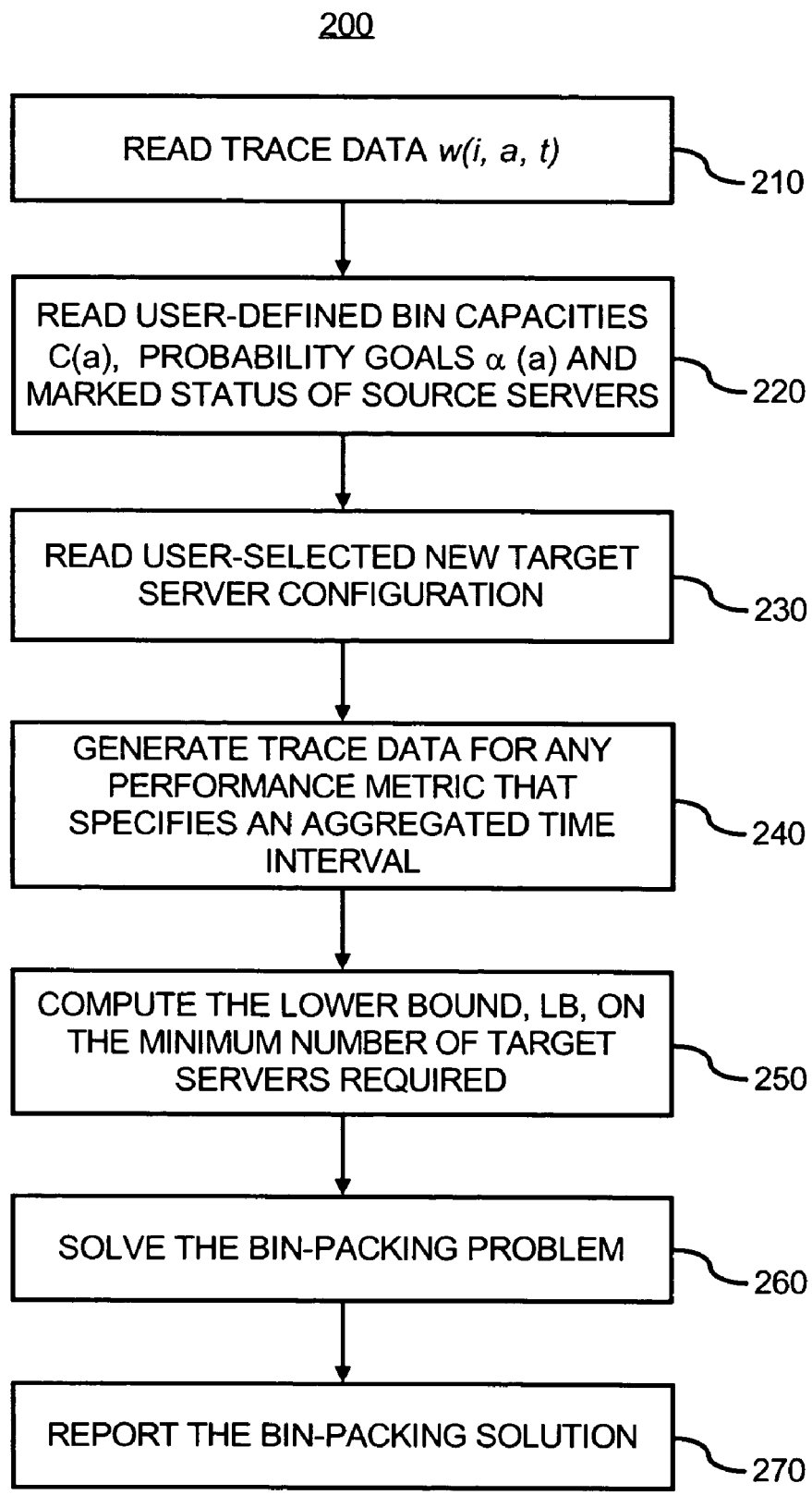
FIG. 2 illustrates a bin-packing process, in accordance with one embodiment.
Figure 3:
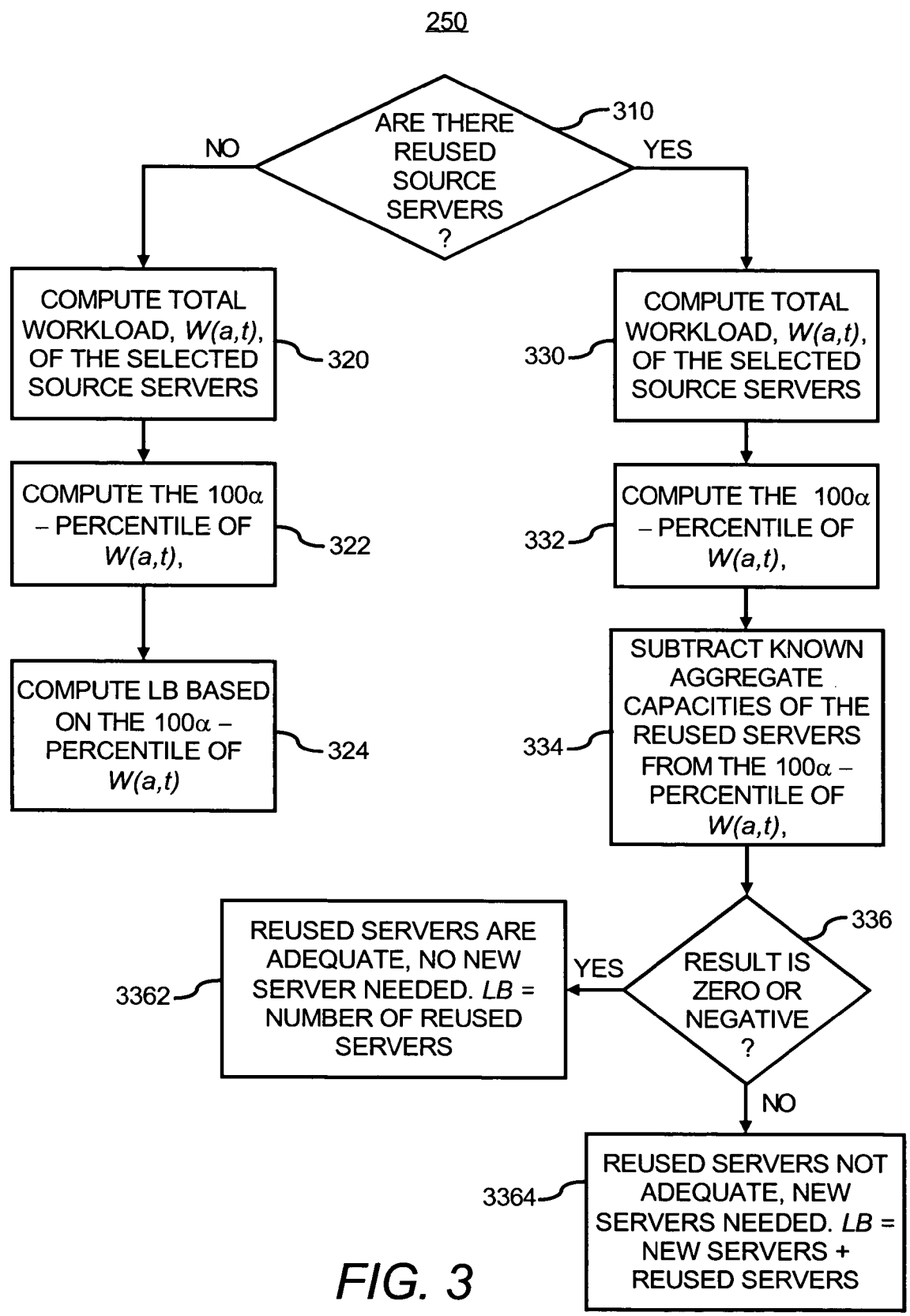
FIG. 3 illustrates details of the computation of a lower bound in FIG. 2, in accordance with one embodiment.

The mathematical optimization method with an integer programming formulation that is used to solve the bin-packing problem at 260 in FIG. 2 is now described. It is possible for the consolidation analysis module 147 to employ this method to find the exact optimal solution, with minimum number of target servers and the associated consolidation scenario, to the bin-packing problem. In this mathematical formulation, all servers are Replace servers (there are no Reuse or Undecided servers). However, it is possible to incorporate Reuse servers into such a mathematical formulation by simply fixing corresponding y(j) variables to 1. It is also possible to extend the same mathematical formulation to Undecided servers by treating the Undecided servers as new target servers (thus the optimal y(j) values will indicate whether each Undecided server is to be Reuse (y(j)=1) or Replaced y(j)=0). As depicted in FIG. 2, the input data to the bin-packing problem includes:

a) the trace data w(i, a, t) for source server i=1, 2, . . . , n, performance metric a=1, 2, . . . , K, and time interval t=1, 2, . . . , T;

b) the bin capacities C(a) over all time intervals t but potentially different
across the performance metrics a=1, 2, . . . , K; and c) the probability goals α(a) for satisfying the bin capacity C(a) for each performance metric a.

Furthermore, the decision variables are defined as follows:

y(j)=1 or 0: 1 if server j is used after consolidation, 0 otherwise;

x(i,j)=1 or 0: 1 if server i (before consolidation) is to be consolidated into server j, 0 otherwise; and v(j,a,t)=1 or 0: 1 if server j (after consolidation) violates the consolidation metric limit at time interval t, 0 otherwise.

Before solving the bin-packing problem with the aforementioned mathematical optimization method, there is a determination of the number of servers (after consolidation) m that is guaranteed to accept all existing workloads and satisfy the user-defined performance constraints. In other words, m is an upper bound on the number of servers required to satisfy the performance constraints, where m includes new target servers and Reuse servers. In one embodiment, m is set to equal the number of source servers before consolidation, whereby the m servers are labeled with integers from 1 through m (j=1, 2, . . . , m). Thus, the optimal solution to the bin-packing problem is the minimum subset of these m labeled servers such that the user-defined performance constraints are satisfied. Accordingly, the objective function for the mathematical optimization method is the number of servers after the consolidation, or:

$$\text{Minimize } Z = \sum_{j=1}^{m} y(j), \quad (1)$$

wherein Minimize Z represents any well known mathematical optimization, algorithm but, according to one embodiment, with the following mathematical constraints:

$$x(i,j) \leq y(j), \text{ for servers } i=1, 2, \ldots, n \text{ and servers } j=1, 2, \ldots, m. \quad (2)$$

$$\sum_{j=1}^{m} x(i,j) = 1, \text{ for servers } i = 1, 2, \ldots, n. \quad (3)$$

$$\sum_{i=1}^{n} w(i, a, t) \cdot \frac{SpeedFactor(i, a)}{SpeedFactor(j, a)} \cdot x(i, j) - M(j, a, t) \cdot v(j, a, t) \leq C(a), \quad (4)$$

for servers j = 1, 2, . . . , m and metrics a = 1,
2, . . . , K and time intervals t = 1, 2, . . . , T.

$$x(i,j)=0 \text{ or } 1 \text{ (binary variable).} \quad (5)$$

$$0 \leq y(j) \leq 1 \text{ (continuous variable).} \quad (6)$$

$$\sum_{t=1}^{T} v(j, a, t) \leq [1 - \alpha(a)]T, \text{ for servers } j = 1, \quad (7)$$

2, . . . , m and metrics a = 1, 2, . . . , K.

$$v(j,a,t) \leq y(j), \text{ for servers } j=1, 2, \ldots, m, \text{ metrics } a=1, 2, \ldots, K \text{ and time intervals } t=1, 2, \ldots, T. \quad (8)$$

$$v(j,a,t)=0 \text{ or } 1 \text{ (binary variable).} \quad (9)$$

The mathematical constraint (2) ensures that it is possible for a server i to be consolidated into a target server j only if server j is actually used after the consolidation. The mathematical constraint (3) ensures that each source server i is to have exactly one destination server, not zero destination server (whereby the source server's workload is not assigned to any server after the consolidation) or two destination servers (whereby the source server's workload is split into two destination servers). The mathematical constraint (4) ensures that the total workload on the target server j satisfies the user-defined capacity limit C(a), wherein the $$\text{ratio } \frac{SpeedFactor(i, a)}{SpeedFactor(j, a)}$$

expresses the relative speed difference between source server i and target server j on performance metric a. Thus, such a ratio is used to make sure that the workloads from various source servers w(i, a, t) are properly scaled into the target server. In mathematical constraint (4), the parameter M(j, a, t) is an artificial, large constant such that when v(j, a, t)=1, the mathematical constraint (4) is automatically satisfied. In actual implementation, it is possible to set the parameter M to be:

$$M(j, a, t) = \max\left\{\sum_{i=1}^{n} w(i, a, t) \cdot \frac{SpeedFactor(i, a)}{SpeedFactor(j, a)} - C(a), 0\right\}.$$

This is a valid selection, because, when v(j, a, t)=1, the left-hand-side of mathematical constraint (4) becomes:

$$\sum_{i=1}^{n} w(i, a, t) \cdot \frac{SpeedFactor(i, a)}{SpeedFactor(j, a)} \cdot x(i, j) - M(j, a, t) \leq$$

$$\sum_{i=1}^{n} w(i, a, t) \cdot \frac{SpeedFactor(i, a)}{SpeedFactor(j, a)} \cdot \sum_{j=1}^{m} x(i, j) - M(j, a, t) =$$

$$\sum_{i=1}^{n} w(i, a, t) \cdot \frac{SpeedFactor(i, a)}{SpeedFactor(j, a)} \cdot 1 - M(j, a, t) =$$

$$\sum_{i=1}^{n} w(i, a, t) \cdot \frac{SpeedFactor(i, a)}{SpeedFactor(j, a)} -$$

$$\max \left\{ \sum_{i=1}^{n} w(i, a, t) \cdot \frac{SpeedFactor(i, a)}{SpeedFactor(j, a)} - C(a), 0 \right\} \leq$$

$$\sum_{i=1}^{n} w(i, a, t) \cdot \frac{SpeedFactor(i, a)}{SpeedFactor(j, a)} -$$

$$\left( \sum_{i=1}^{n} w(i, a, t) \cdot \frac{SpeedFactor(i, a)}{SpeedFactor(j, a)} - C(a) \right) = C(a)$$

That is, when v(j, a, t)=1, the mathematical constraint (4) is automatically satisfied. As shown in the above derivation, the mathematical constraint (3) is used.

The mathematical constraint (5) indicates that variables x(i, j) take binary values, 0 or 1. The mathematical constraint (6) expresses decision variables y(j) as continuous variables between 0 and 1. In the final optimal solution, y(j) automatically takes integer values (0 or 1), as the integrality of y(j) is guaranteed from the integrality of variables x(i,j) and v(j, a, t). The mathematical constraint (7) expresses the probabilistic goals and ensures that no more than α(a)×100% time intervals (that is, total T time intervals) can have a violation v(j, a, t)=1, that is, the total workload on server j on performance metric a exceeding the capacity limit C(a). The mathematical constraint (8) allows violation instances v(j, a, t) to occur only at the target servers used after the consolidation. The mathematical constraint (9) states that the variables representing violation instances v(j, a, t) are to assume binary values (0 or 1).

For large-size, bin-packing problems, for example, when there are 10,000 time intervals (T=10,000), two performance metrics (a=1, 2), and 10 target servers after consolidation (j=1-10) that provide 10,000×2×10=200,000 binary variables v(j, a, t) and 200,000 inequalities in the mathematical constraint (4), the run time for finding the optimal solution with the aforementioned mathematical optimization method may be exceedingly long. Accordingly, in an alternative embodiment, the consolidation analysis module employs heuristic approaches to solve the bin-packing problem at 260 in FIG. 2. These heuristic approaches are further described below, wherein the term "trace" is used to emphasize the dynamic aspect of a physical server, and the term "server" or "bin" refers to the static properties of a physical server. All three terms may refer to the same physical server. The input data for the heuristic approaches include: a) the server list of source servers selected for consolidation; and b) performance time series data, that is, the trace data.

In one embodiment, the trace data for each counter is contained stored in a separate data sheet, file, or database table. Thus, in mathematical terminology used earlier, the workload data w(i, a, t) is possibly contained in multiple data sheets, with each data sheet corresponding to a performance metric (a), that is, each data sheet contains w(i, a, t) for a given a. Furthermore, all data sheets are to have the same data structure. For example, the first column of each data sheet includes a "Time Stamp" containing either date-time values such as "2004-10-01 00:05:00" or integer values such as 0, 1, 2, 3. Each subsequent column (from column 2 to column n) contains a trace for each source server, wherein the first row in each subsequent column (2–n) contains a Server ID, which is string-valued and may be any combination of letters and numbers. Thus, the trace data in each subsequent column (2–n) starts from row 2 and goes up to row T. Furthermore, the sequence of columns for the source servers is identical across the different trace data sheets. For example, if Server ID="Server001" is in column 2 of a first trace data sheet, then Server ID="Server001" is also in column 2 of a second trace data sheet, and column 2 of a third trace data sheet, and so on. A corollary of the identical sequence is that all trace data sheets have the same number of columns. However, the trace data sheets are not required to have the same number of rows, that is, each trace data sheet is not subjected to the same time stamps across all the data sheets. Nevertheless, within each trace data sheet, the different columns (different Server IDs) are synchronized so that each row represents the same time stamp across all Server IDs (across all columns). In another embodiment, w(i, a, t) may be stored in a single table in a relational database, where three columns store the values of i, a, and t, and a fourth column stores the value w.

In one embodiment, the server list of source servers selected for consolidation is a static asset inventory stored or contained in a file. It has multiple rows, each representing a source server selected for consolidation, and multiple columns, each describing an attribute or property of a server, such as, but not limited to, the server's vendor/brand, model, CPU type, CPU count, CPU speed, physical memory size, operating system and version, location, function, department. Furthermore, there is a consolidation decision column for designating each source server as Replace, Reuse, Undecided, and Unchanged. Another column in the server list is the Server ID column, which includes IDs that uniquely identify each source server. These Server IDs link the server list to the trace data described earlier.

Figure 4:
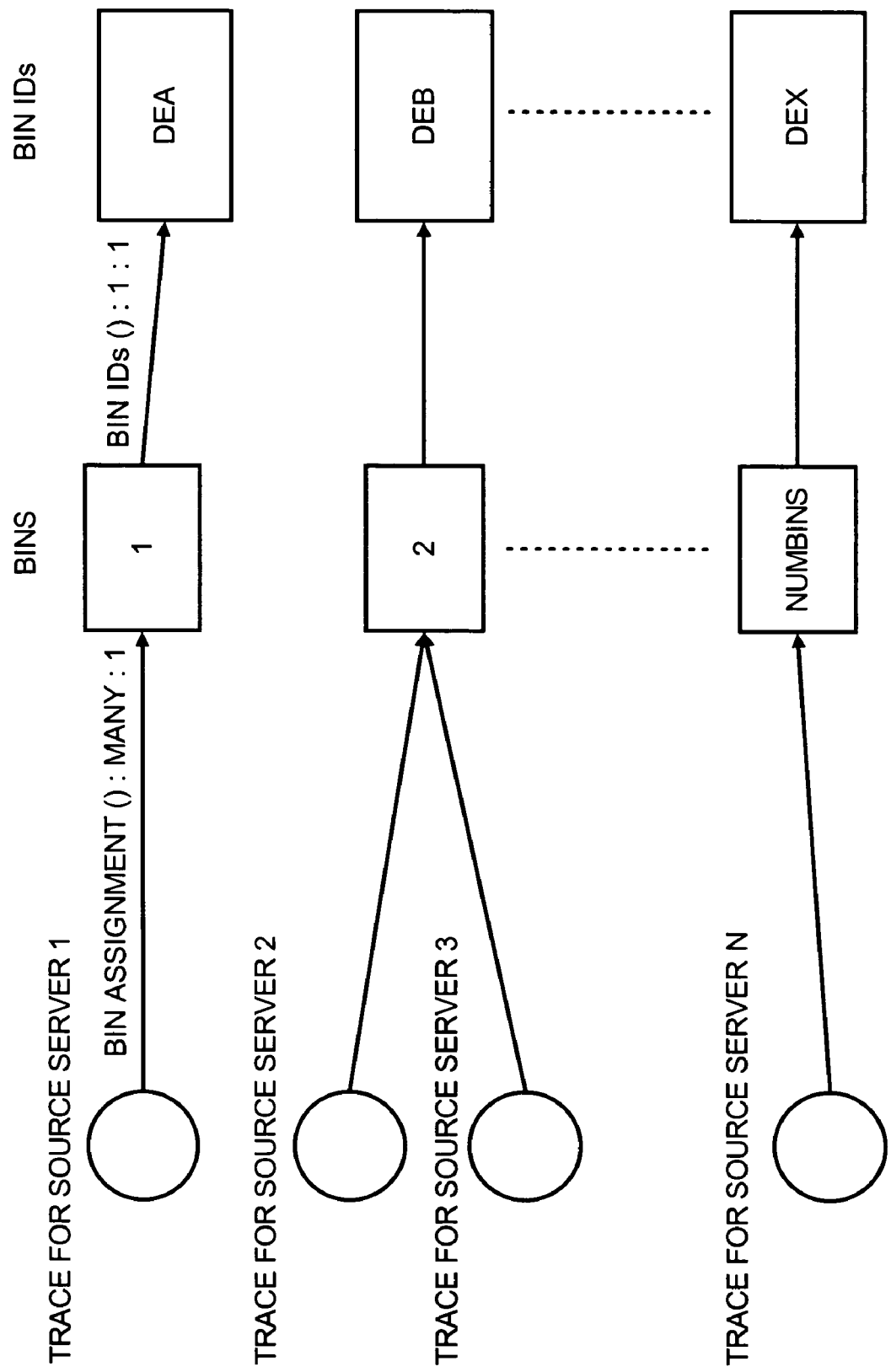
FIG. 4 illustrates an internal data structure of a bin-packing solution using heuristics, in accordance with one embodiment.

FIG. 4 illustrates an internal data structure 400 of a bin-packing solution that employs a heuristic approach, in accordance with one embodiment. The internal data structure 400 includes an integer-valued array BinAssignment(j), which serves as both input and output for a heuristic approach, and a string-valued array BinIDs(nn), which provides the Server ID of Bin nn and has an index 1, 2, 3, . . . , NumBins. The variable j is the column number in a trace data sheet (j represents a source server). The relationship between the trace number, BinAssignment( ) and BinIDs( ) is shown in FIG. 4. When BinAssignment(j)=0, the trace in column j has not been assigned ("Replace"). When BinAssignment(j)=1, the trace in column j is to be ignored ("Unchanged"). When BinAssignment(j)=2, the trace in column j is to be decided ("Undecided"). When BinAssignment(j)=nn where nn>0, the trace in column j is assigned to Bin nn.

Figure 5:
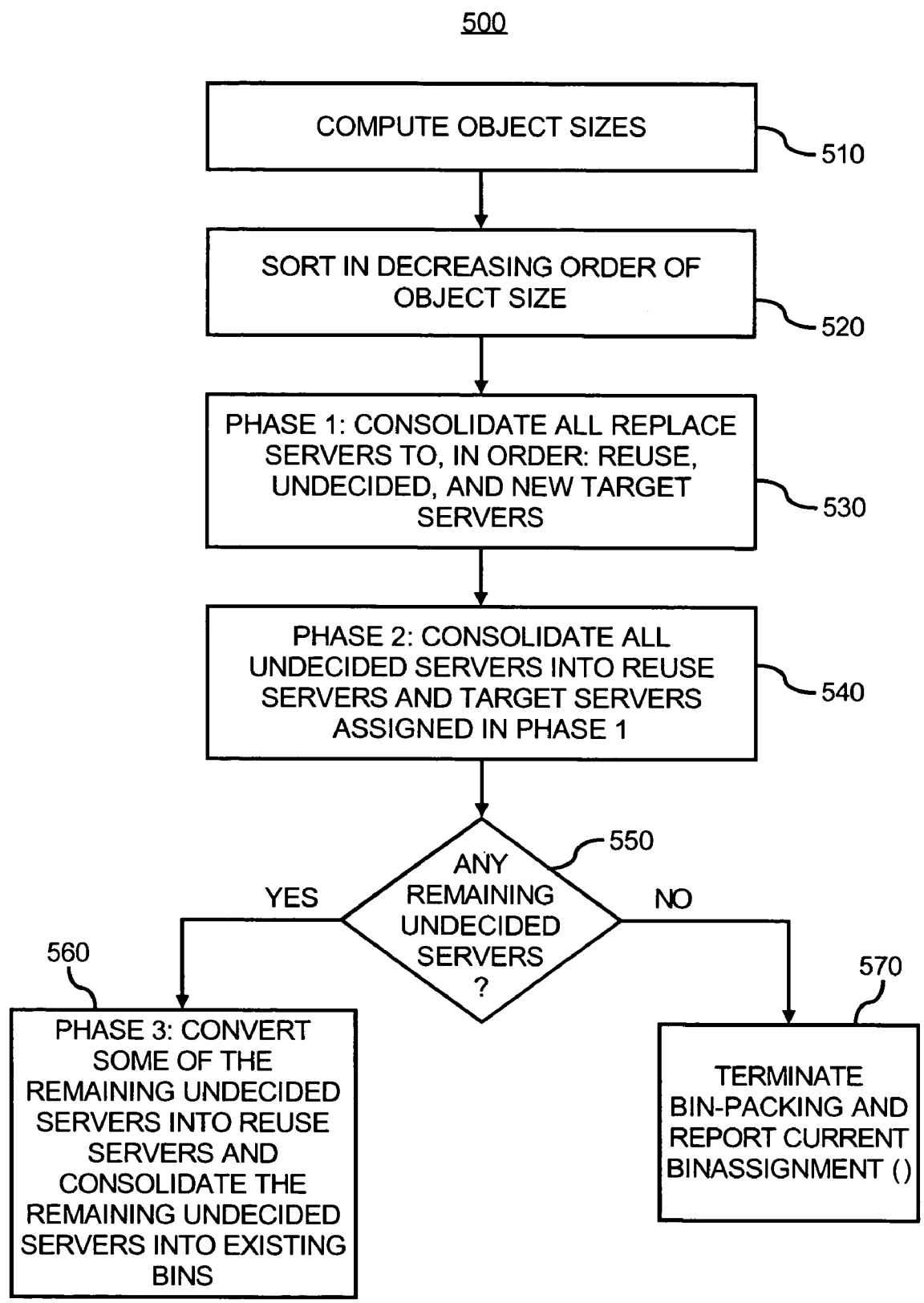
FIG. 5 illustrates a process flow for a first-fit heuristic for solving a bin-packing solution, in accordance with one embodiment.

FIG. 5 illustrates a process flow 500 for a first-fit decreasing heuristic approach to solving the bin-packing problem by the consolidation analysis module 147, in accordance with one embodiment. The process flow 500 goes through three phases. In Phase 1, all Replace source servers are consolidated into Reuse, Undecided, or new target servers. Phases 2 and 3 handle the Undecided servers, without introduction of any new target server. First, Phase 2 attempts to consolidate all Undecided servers into Reuse and new target servers as obtained from Phase 1. Then, the process flow 500 terminates when it is possible to pack all Undecided servers into the existing Reuse and new target servers. Phase 3 is employed when some Undecided servers remain after the end of Phase 2, wherein an Undecided server is converted or re-marked as a Reuse server one at a time, and attempts are made to consolidate (pack) the remaining Undecided servers into the newly converted Reuse servers.

Accordingly, at 510, the process flow 500 begins with a computation of the object sizes, that is, the workload sizes on the selected source servers. As noted before, trace data is a multi-element array w(i, a, t), where, for example, a=1, 2, 3, 4, and t=1, 2, ..., 10,000. Each element in the array, that is, each (a, t) combination corresponds to a dimension. However, the object size in bin-packing is a one-dimensional number. Hence, the multi-element array w(i, a, t) is to be aggregated into a single number: size w(i). There are many possible aggregation methods, or aggregators. In one embodiment, an average aggregator is employed, wherein each given performance metric a is averaged over t to get $\underline{w}$(i, a). The average aggregator presents no problems because the trace values are of the same type and the same physical unit, such as CPU utilization percentage, memory KB, or disk I/O count.

To go from $\underline{w}$(i, a) to w(i), however, the trace values for different metrics potentially have different physical units and with vastly different magnitudes. For example, the average CPU utilization, as averaged over t, may be 8%, but the average memory KB may be 2,000,000 KB (2 GB). In this case, a simple arithmetic average of the two numbers 8% and 2,000,000 is not possible because they have different physical units, one a percentage and one in bytes. One solution is to "normalize" each metric value by computing w(i, a)/C(a), that is, divide 8% by the user-defined limit on the target server (such as 50% in CPU utilization) in the metric a, and divide 2,000,000 KB by the user-defined limit on the target server (such as 8,000,000 KB in memory size). After normalization, w(i, a) is a unit-less number, and it is possible to apply the average aggregator across all given metrics a. In summary, to compute the object sizes w(i), an aggregator such as "Average" is applied over t to each performance metric a. Next, each averaged performance metric a is "normalized" by the target server limits C(a) in the user-defined consolidation constraints. Then, another aggregator such as "Average" is applied over each normalized a. In mathematical terms, the Average-Normalize-Average aggregator is defined as:

$$\text{Average-Normalize-Average: } \underline{w}(i, a) = \frac{1}{T}\sum_{t=1}^{T} w(i, a, t);$$

$$\underline{w}(i) = \frac{1}{A}\sum_{a=1}^{A} \frac{\underline{w}(i, a)}{C(a)}.$$

It is possible to use other aggregators such as "Average-Normalize-Max," "Max-Normalize-Max," and "Max-Normalize-Average." For example, "Average-Normalize-Max" is to first average over t, then normalize, then take the maximum over a, or:

$$\text{Average-Normalize-Max: } \underline{w}(i, a) = \frac{1}{T}\sum_{t=1}^{T} w(i, a, t);$$

$$\underline{w}(i) = \max_{a=1,2,\ldots,A}\left\{\frac{\underline{w}(i, a)}{C(a)}\right\}.$$

The Average-Normalize-Max aggregator reflects the critical performance metric, as mentioned earlier, better than other aggregators. It is also possible to have an aggregator "Percentile-Normalize-Average" or "percentile-Normalize-Max," where the Percentile is taken over t under the given probability goal α(a) in the user-defined consolidation constraint:

Percentile-Normalize-Max:

$$\underline{w}(i, a) = q_{t=1,2,\ldots,T}(w(i, a, t)\alpha(a)); \quad \underline{w}(i) = \max_{a=1,2,\ldots,A}\left\{\frac{\underline{w}(i, a)}{C(a)}\right\}.$$

It should be noted that because the object sizes are used to determine the relative ordering of the objects, the magnitude of the object size is not utilized. For this reason, the aggregator "Sum" is equivalent to the aggregator "Average." For example, "Sum-Normalize-Average" is equivalent to "Average-Normalize-Average," and is equivalent to "Average-Normalize-Sum."

Figure 6:
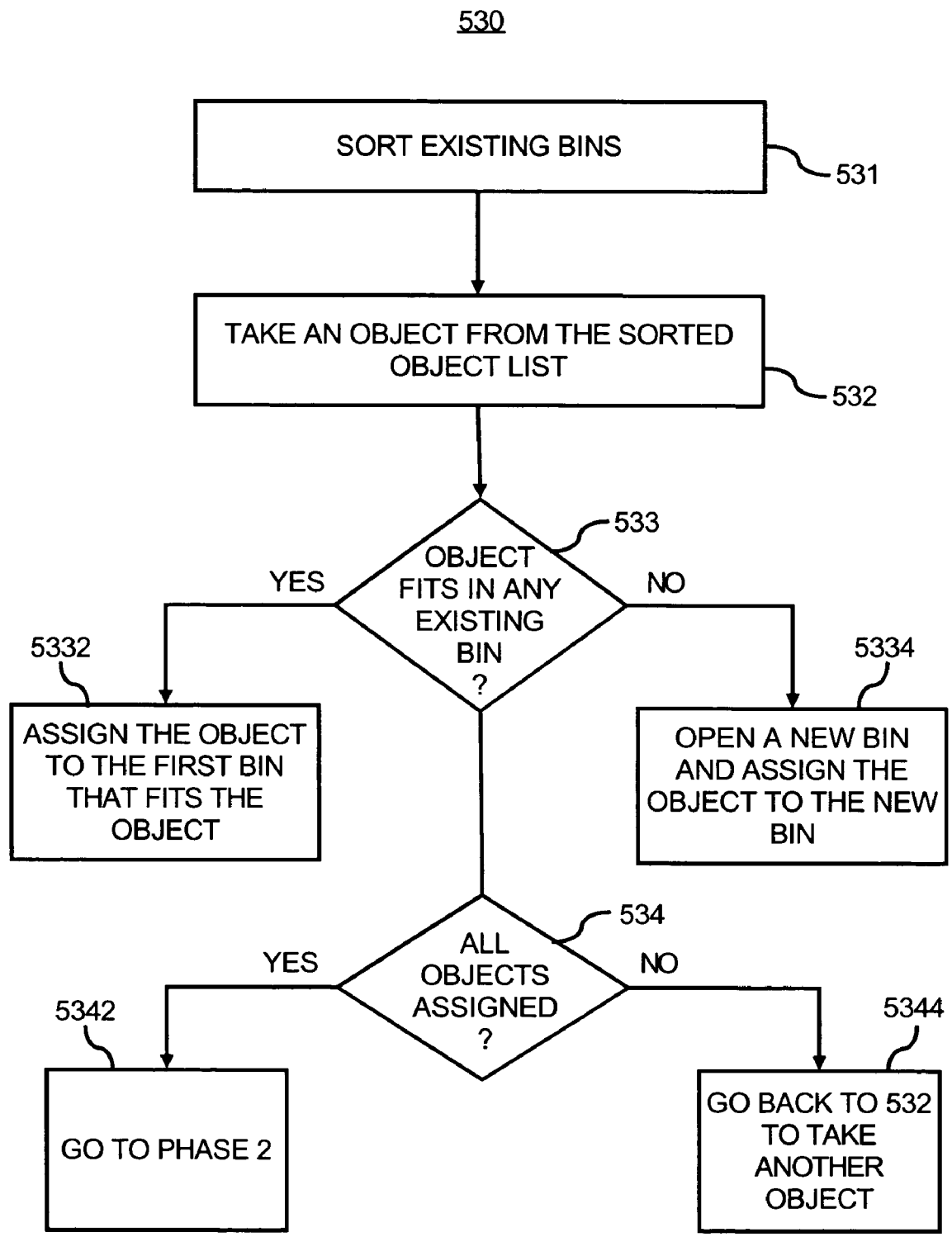
FIG. 6 illustrates further details of Phase 1 in the process flow depicted in FIG. 5, in accordance with one embodiment.

Referring back to the process flow 500 in FIG. 5, at 520, once the object sizes are computed, the objects are sorted in decreasing order of object size. At 530, Phase 1 begins, wherein all Replace servers are to be consolidated to Reuse, Undecided, and new target servers, strictly in such order. Referring now to FIG. 6, which illustrates further details of Phase 1 at 530. At 531, the existing bins of Reuse and Undecided servers are sorted, whereby the Reuse servers are sorted in any order followed by the Undecided servers sorted in decreasing order of server CPU processor power or speed index, or ServerTPM. At 532, an object is taken from the sorted object list obtained from 520 in FIG. 5, starting with the first object in the list. At 533, it is determined whether the object fits in one of the existing bins, going through the existing bins in the order sorted at 531. If yes, at 5332, the object is assigned to the first bin that fits the object. If no, at 5334, a new bin, that is, a new target server, is opened, and the object is assigned to the new bin. Steps 532, 533, 5332, and 5334 are repeated for each and every object in the sorted object list, as shown at 534, 5342, and 5344. Once all the objects in the sorted object list are assigned, the process flow 500 in FIG. 5 proceeds to Phase 2.

To determine whether an object fits in a specific existing bin, the content of the existing bin is first determined. A bin content is identified by three aspects: Bin number j, performance metric a (such as CPU utilization or physical memory used), and time interval t. An array BinContent(j, a, t) is used to denote the content of a bin. If traces i1, i2 and i3 are assigned to a bin j, then BinContent(j, a, t) is computed as:

$$BinContent(j, a, t) = w(i1, a, t) * ConversionFactor(i1, j, a) +$$
$$w(i2, a, t) * ConversionFactor(i2, j, a) +$$
$$w(i3, a, t) * ConversionFactor(i3, j, a),$$

where w(i1, a, t) is the trace i1 value for metric a at time interval t, w(i2, a, t) is the trace i2 value for metric a at time interval t, and w(i3, a, t) is the trace i3 value for metric a at time interval t. The $$ConversionFactor(i1, j, a) = \frac{SpeedFactor(i1, a)}{SpeedFactor(j, a)}.$$

accounts for the speed difference between trace i1 (the source server) and the destination or target bin j. For a metric a that is "CPU"-typed, ConversionFactor(i1,j, a)=ServerTPM(i1)/ServerTPM(j). This reflects the fact that, for example, a 10% CPU utilization on a source server is to be converted into 5% CPU utilization on a destination server that is twice as fast. For metric a being physical memory used or I10 Count, and many other performance metrics, ConversionFactor(i1, j, a)=1.

The workload growth factor, the virtualization fixed overhead, and the virtualization variable overhead are further incorporated in the following formula:

BinContent(j,a,t)=[w(i1,a,t)×ConversionFactor(i1,j, a)+w(i2,a,t)×ConversionFactor(i2,j,a)+w(i3,a,t)× ConversionFactor(i3,j,a)]×(1+Workload growth factor such as 10%)+(Virtualization Fixed Overhead, such as 2%)+3×(Virtualization Variable Overhead, such as 1%), whereby there are 3×(Virtualization Variable Overhead) because there are 3 traces (i1, i2, i3) assigned to the bin.

It is possible that BinContent(j, a, t) as computed above results in an "overflow", that is, it takes on a value that is above the physical limit. For example, if metric a is CPU utilization, then it is possible that BinContent(j, a, t)=105%. Because the CPU utilization cannot exceed 100% by definition, there is an overflow in BinContent(j, a, t). In one embodiment, overflow is dealt by incorporating a "carry-forward" methodology described below. After BinContent(j, a, t) is computed for all t, the following steps are executed.

(1) Set initial value: Overflow=0.
(2) For t=1, 2, ..., T:
  a. Set W=Overflow+BinContent(j, a, t).
  b. If W>100% (the physical limit), then
    i. Set Overflow=W−100%,
    ii. Set BinContent(j, a, t)=100%.
  c. Else,
    i. Set Overflow=0,
    ii. Set BinContent(j, a, t)=W.

This carry-forward methodology produces the correct performance prediction when: (1) the workload is not lost if it is not satisfied within the time interval it arrives in, and (2) other performance metrics do not affect, or are not affected by, the current performance metric's carry-forward. Furthermore, in one embodiment, because of the potentially large size of the BinContent(j, a, t) array for all bins j and all performance metrics a, such an array is not saved in memory. Instead, only an array CurrentBinContent(t) for the current bin j and metric a is stored in memory, and that array is discarded once the summary statistic (such as the actual percentage of intervals that meet the user-defined limit of 65%) is computed for bin j and metric a.

As mentioned earlier, once the content of an existing bin is determined by the above BinContent(j, a, t) computation, it is possible to make a determination regarding whether an object fits in such an existing bin if for each metric a of all the user-defined constraints, BinContent(j, a, t) satisfies the capacity limit C(a) and probability goal a(a) for the metric a. For example, if the user-defined constraint is "5-minute CPU utilization no more than 65% with a probability goal of 0.99," then the BinContent(j, a, t) is examined after the trace i is fit into bin j, that is, pretending that trace i can fit into the given bin j, to check whether the 99$^{th}$ percentile (over t) in the BinContent(j, a, t) is no more than 65%. If yes, then trace i can fit into the given bin j for metric a. The same check is performed for each user-defined metric a.

In one embodiment, a function FitBin(i, j) returns True or False to indicate whether trace i fits into bin j, and a function FitBinA(i, j, a) returns True or False to indicate whether trace i fits into bin j on metric a. Thus, FitBin(i, j) returns True if and only if FitBinA(i, j, a) returns True for all metrics a. To satisfy the needs later for the "best-fit" heuristic approach, the function FitBinA(i, j, a) returns several additional values (for a given metric a): (1) the probability of fit, which is the percentage of time intervals t in BinContent(j, a, t) that are no more than the capacity limit C(a); (2) the capacity used before fitting trace i to the given bin (the "capacity" is the percentile in BinContent(j, a, t) corresponding to the probability goal in the metric); and (3) the capacity used after fitting trace i to the given bin. It should be noted that the capacity limit C(a) such as Physical Memory takes the user-defined value for the new target server if bin j is a new server; and the value in the server configuration if bin j is an existing Reuse server.

Figure 7:
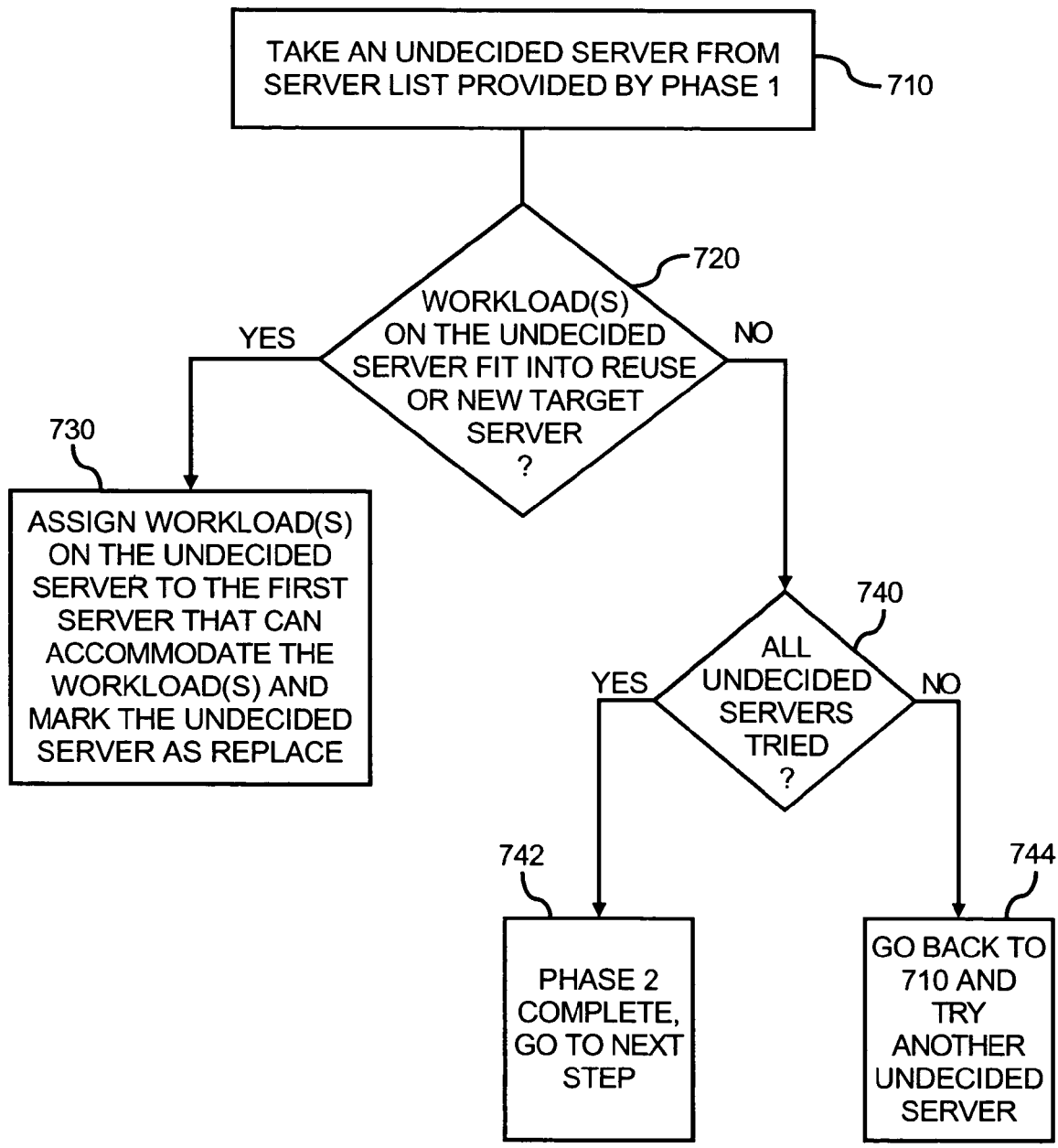
FIG. 7 illustrates further details of Phase 2 in the process flow depicted in FIG. 5, in accordance with one embodiment.

Once Phase 1 is completed, the consolidation analysis module 147 proceeds with Phase 2, shown at 540 in FIG. 5. Referring now to FIG. 7, which illustrates further details of Phase 2. At 710, Phase 2 begins, wherein an Undecided server is taken from the server list. At 720, it is determined whether the workload(s) handled by such Undecided server fit into a Reuse or new target server. If yes, at 730, such workload(s) is assigned to the first Reuse or new target server that is able to accommodate the workload(s), and the Undecided server is re-marked as Replace. If no, Phase 2 proceeds to 740, where it is determined whether all Undecided servers in the server list have been tried. If yes, at 742, Phase 2 is complete, and the process flow 500 in FIG. 5 proceeds to the next step beyond Phase 2. If no, at 744, Phase 2 is repeated at 710 for another Undecided server in the server list.

Referring back to FIG. 5, once Phase 2 is completed, at 550 it is determined whether there are any remaining Undecided servers. If no, the bin-packing process is terminated, and the current BinAssignment( ) is reported. If yes, the process flow 500 proceeds to Phase 3, as described below.

Figure 8:
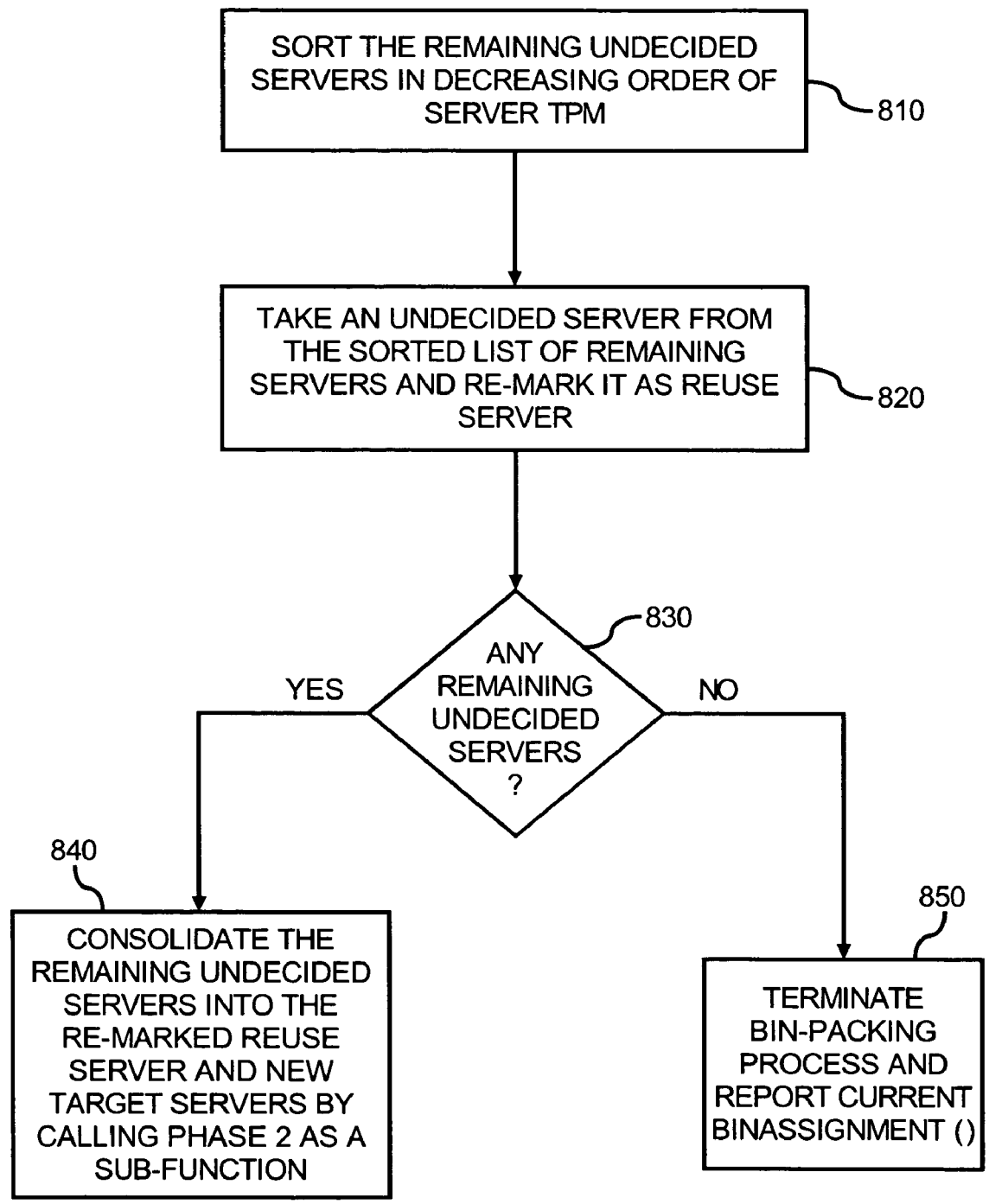
FIG. 8 illustrates further details of Phase 3 in the process flow depicted in FIG. 5, in accordance with one embodiment.

Referring now to FIG. 8, which illustrates further details of Phase 3 as depicted at 560 in FIG. 5. At 810, Phase 3 begins with the sorting of the remaining Undecided servers from Phase 2 in decreasing order of server CPU processor power index ServerTPM. At 820, an Undecided server is taken from the sorted list of the remaining Undecided servers and re-marked as a Reuse server. At 830, it is determined whether there are any remaining Undecided servers in the sorted list. If yes, at 840, attempts are made to consolidate each of the remaining Undecided servers into the re-marked Reuse server and the new target servers by running Phase 2 again as a sub-function. If no, the bin-packing process is terminated and the current BinAssignment( ) is reported. Thus, steps 830 and 840 are repeated until there is no more Undecided server, and the bin-packing process is terminated at 850.

As described above, in the process flow 500 for the first-fit heuristic approach, the objects or source servers are sequenced by their workload sizes, as shown at 520, and the bins or target servers are sequenced based on their user designations (in order of "Re-Use", "Undecided", and new target servers) in Phase 3, as shown at 810 in FIG. 8. Thus, an Undecided server is to be re-marked as a bin, that is, a Reuse server, if and only if a trace in the Undecided server cannot be accommodated in any existing Reuse servers. Whereas, additional new servers are to be used if and only if a trace in an Undecided server cannot be accommodated in the existing Reuse servers and Undecided servers. Furthermore, there is a secondary sequencing within the Undecided servers, whereby an Undecided server that has a higher ServerTPM (higher CPU processing power) is to be used first before another Undecided server that has a lower ServerTPM. Such sequencing of Undecided servers potentially reduces the total number of bins after the consolidation.

Additionally, it is possible that an Undecided server in Phase 2 and Phase 3 already has one (itself), two, or more traces assigned to it. Thus, whether it is possible to pack an Undecided server into one of the existing bins ("Reuse" servers or new servers from Phase 1) depends on whether it is possible to pack all of the existing traces assigned to the Undecided server into the existing bins. If the Undecided server fits into the existing bins, then the given Undecided server is re-marked or converted as a Replace server. Otherwise, the Undecided server is to be converted into a Reuse server, and this procedure is repeated until all Undecided servers have been removed or converted to Reuse.

The work flow described in Phase 1 for the bin-packing process is a "first-fit decreasing" heuristic because the term "decreasing" refers to the fact that the traces (in the objects) are sorted in decreasing order. It is also a "first-fit" because the trace is assigned to the first bin in which the trace is found to fit, that is, there is no search for the best bin for the trace. However, alternative embodiments are contemplated, wherein "best-fit" heuristics are used in Phase 1, as described below with reference to FIG. 6.

In one best-fit heuristic, the highest capacity used after fit, rather than applying the aforementioned "first-fit" heuristic to determine whether an object fits in one of the existing bins at 533 in FIG. 6, the consolidation analysis module 147 searches for an existing bin that provides the highest capacity used when a trace i is fit into such a bin. Thus, a main purpose of this best-fit heuristic is the to pack an existing bin to its fullest extent (that is, to its user-defined limit). First, there is a setting of an initial value, BestBinForObject=0. Second, existing bins are searched to find the bin that provides the highest capacity used after fitting a trace i into such a bin, which is then designated as BestBinForObject. It is possible that no current bins can fit trace i, in which case, BestBinForObject remains 0. Third, the trace i is assigned to the best bin found. If BestBinForObject>0, then set BinAssignment(i)=BestBinForObject (at 5332 in FIG. 6). Otherwise, open a new bin and set BinAssignment(i)=new bin (similar to 5334 in FIG. 6).

In another best-fit heuristic, the lowest capacity used after fit, to determine whether an object fits in one of the existing bins at 533 in FIG. 6, there is a search for a bin that provides the lowest capacity used if a trace i is fit into such a bin. Thus, a main purpose of this best-fit heuristic is to spread the existing workloads more evenly across the existing bins. First, there is a setting of an initial value, BestBinForObject=0. Second, existing bins are searched to find the bin that provides the lowest capacity used after fitting a trace i into such a bin, which is then designated as BestBinForObject. It is possible that no current bins can fit trace i, in which case, BestBinForObject remains 0. Third, the trace i is assigned to the best bin found. If BestBinForObject>0, then set BinAssignment(i)=BestBinForObject (in lieu of 5332 in FIG. 6). Otherwise, open a new bin and set BinAssignment(i)=new bin (similar to 5334 in FIG. 6).

In still another best-fit heuristic, the least capacity increment heuristic, a main purpose is to find a bin whose content is to be incremented by the least amount if trace i is to fit into such a bin, wherein, incremental capacity=capacity used after the fit−capacity used before the fit. Recall that "capacity used" is defined as the percentile of BinContent(j, a, t) according to the user-defined probability goal. It should be noted that, because of the difference in the time-patterns of resource usage in different bins, trace i potentially brings a different increment to a different bin. Also, while at times the least-capacity-increment heuristic and lowest-capacity-used-after-fit heuristic yield the same bin, because of the difference in the time-patterns of resource usage in different bins, a bin that yields the least incremental capacity is potentially different than one that yields the lowest capacity used after fit. Usually, the bin that yields the least incremental capacity has a time-pattern of resource usage that matches in a peak-to-valley fashion against the given trace i, and that matches different resource bottlenecks (such as a CPU-intensive trace against a memory-intensive trace). For this best-fit heuristic, first there is also a setting of an initial value, BestBinForObject=0. Second, existing bins are searched to find the bin that provides the least maximum incremental capacity over all metrics used after fitting a trace i into such a bin, which is then designated as BestBinForObject. Here, the maximum incremental capacity over all metrics a is computed, whereby each bin is given a number, and the least of these maximum numbers (over existing bins) is chosen and designated as BestBinForObject. It's possible that no current bins can fit trace i, in which case, BestBinForObject remains 0. Third, the trace i is assigned to the best bin found. If BestBinForObject>0, then set BinAssignment(i)=BestBinForObject (in lieu of 5332 in FIG. 6). Otherwise, open a new bin and set BinAssignment(i)=new bin (similar to 5334 in FIG. 6).

What has been described and illustrated herein are embodiments along with some of their variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for server consolidation, comprising:
accessing, by a consolidation analysis module in a computer, performance data of a plurality of source servers in a desired environment that are selected for server consolidation;
receiving multiple consolidation parameters for a desired target server platform including target servers;
receiving selected configurations for a new target server that is potentially included in the desired target server platform;
computing, by the consolidation analysis module in the computer, a minimum number of the target servers required to consolidate the plurality of source servers based at least on the performance data, the selected configurations for the desired target server platform, and the multiple consolidation parameters;
marking each of the plurality of source servers with one of a first status, second status, and third status, wherein the first status indicates the marked source server is to be replaced in the server consolidation, the second status indicates the marked source server is to be reused in the server consolidation, and the third status indicates the marked source server is to be replaced or reused as necessary;
deriving, by the consolidation analysis module in the computer, a bin-packing solution to the server consolidation based at least on the performance data, the selected configurations for the new target server, and the minimum number of the target servers, wherein the bin-packing solution includes assigning each of the source servers to one of the target servers; and
reporting the bin-packing solution, including reporting the computed minimum number of the target servers and a consolidation assignment specifying the target servers that each of the source servers is assigned to.

2. The method of claim 1, wherein marking each of the plurality of source servers further includes a fourth status, wherein the fourth status indicates the marked source server is to be unchanged.

3. The method of claim 2, wherein:
the multiple consolidation parameters include a performance metric, a performance capacity for the performance metric, and a probability goal for reaching the performance capacity for the desired target server; and
computing the minimum number of the target servers includes,
   determining whether any of the plurality of source servers is marked with one of the second status and the third status;
   upon the determining that none of the plurality of source servers is marked with the second status and the third status,
      a) computing a total workload of the plurality of source servers for at least the performance metric;
      b) computing a percentage of the total workload that results from applying the probability goal to the total workload; and
      c) computing the minimum number of the target servers for each of the multiple consolidation parameters based on a division of the total workload percentage by the performance capacity of the performance metric.

4. The method of claim 2, wherein:
the multiple consolidation parameters include a performance metric, a performance capacity for the performance metric, and a probability goal for reaching the performance capacity for the desired target server; and
computing the minimum number of the target servers includes,
   determining whether any of the plurality of source servers is marked with the second status;
   upon the determining that at least one of the plurality of source servers is marked with the second status,
      a) computing a workload of the plurality of source servers for at least the performance metric;
      b) computing a percentage of the total workload that results from applying the probability goal to the total workload;
      c) subtract a total aggregate capacities of all known servers in the plurality of source servers that are marked with the second status from the total workload percentage to generate a difference value for the performance metric;
      d) examining whether the difference value for the performance metric is zero or negative; and
      e) upon the examining that the difference value is zero or negative, setting the minimum number of the target servers to be the number of all known servers that are marked with the second status for the each performance metric.

5. The method of claim 4, further comprising:
upon the examining that the difference value is greater than zero,
   a) computing a number of the new target server required based on a division of the difference value by the performance capacity for the performance metric; and
   b) computing the minimum number of the target servers as the sum of the number of the new target server required and the all known servers that are marked with the second status for the performance metric.

6. The method of claim 1, wherein deriving the bin-packing solution comprises:
performing a mathematical optimization procedure using integer programming formulation to derive the bin-packing solution based at least on the performance data, the selected configurations for the new target server, and the minimum number of the target servers.

7. The method of claim 2, wherein deriving the bin-packing solution comprises:
computing workload sizes on each of the plurality of source servers;
sorting the plurality of source servers in decreasing order of the workload sizes for listing in an object list;
first consolidating all servers in the plurality of source servers that are marked with the first status into, in order, all servers in the plurality of source servers that are marked with the second status, all servers in the plurality of source servers that are marked with the third status, and any computed new target servers;
after the first consolidating, second consolidating all servers in the plurality of source servers that are marked with the third status into all servers in the plurality of source servers that are marked with the second status and then the any computed new target servers;
determining whether any server in the plurality of source servers that remain marked with the third status after the second consolidating; and
upon a determination that there remains no server in the plurality of source servers that is marked with the third status after the second consolidating, providing the bin-packing solution that includes a number of the source servers that are marked with the second status and a number of the any computed new target servers.

8. The method of claim 7, further comprising:
upon a determination that there remains at least one server in the plurality of servers that is marked with the third status after the second consolidating,
re-marking the at least one server from the third status to the second status; and
third consolidating any server in the plurality of source servers that remains marked with the third status after the re-marking into all servers that are now marked with the third status, including the re-marked server, and the any computed new target servers.

9. The method of claim 7, wherein:
the multiple consolidation parameters further include a performance metric for the desired target server; and
the method further includes:
   reporting an average watermark for the performance metric in each of the plurality of the source servers that are marked with the second status and each of the plurality of the any computed new target servers;
   reporting a high watermark for the performance metric in each of the plurality of the source servers that is marked with the second status and each of the plurality of the any computed new target servers; and
   reporting a probability goal achieved by each of the plurality of the source servers that is marked with the second status and each of the number of the any computed new target servers for each of the multiple consolidation parameters.

10. The method of claim 7, wherein the first consolidating comprises:
first sorting in any order all servers in the plurality of source servers that are marked with the second status for listing in an existing-bin list;

second sorting in decreasing order of processor speed of all servers in the plurality of source servers that are marked with the third status for listing in the existing-bin list after the first-sorted source servers with the second status;

first-phase determining whether the first source server listed in the sorted object list and marked with the first status fits into any one of the source servers listed in the existing-bin list, starting with the first source server listed in the existing-bin list;

upon the determination that the first source server listed in the sorted object list fits into one of the source servers listed in the existing-bin list, assigning a consolidation of first source server listed in the sorted object list to the one fitted source server listed in the existing-bin list; and upon the determination that the first source server listed in the sorted object list does not fit into any one of the source servers listed in the existing-bin list, assigning the consolidation of the first source server listed in the sorted object list to the new target server.

11. The method of claim 10, wherein the second consolidating comprises:

second-phase determining whether any one of the source servers marked with the third status in the existing-bin list fits into one of the source servers marked with the second status in the existing-bin list or the new target server assigned upon the first-phase determining; and upon a determination that one of the source servers marked with the third status in the existing-bin list fits into one of the source servers marked with the second status in the existing-bin list, re-marking the one source server marked with the third status to the second status.

12. The method of claim 7, wherein upon a determination that there remains at least one server in the plurality of source servers that is marked with the third status after the second consolidating, re-marking one of the at least one server with the second status for server consolidation.

13. The method of claim 12, wherein the re-marking comprises:

sorting in decreasing order of processor speed the at least one server marked with the third status for listing in a sorted list;

re-marking the first-listed server in the sorted list with the second status;

determining whether there are any remaining servers in the sorted list;

upon a determination that there remains no server in the sorted list, providing the bin-packing solution that includes the re-marked server having the second status.

14. The method of claim 13, wherein the re-marking further comprises:

upon a determination that there remains another server in the sorted list, performing the second consolidating again, with the re-marked server having the second status included in the all servers in the plurality of source servers that are marked with the second status.

15. A method for providing a server consolidation service to a customer, comprising:

accessing, by a consolidation analysis module in a computer, first performance data of a plurality of source servers, the first performance data originating from the customer;

setting multiple consolidation parameters for a desired target server platform including target servers, the multiple consolidation parameters including a time interval aggregation function for aggregating at least some of the first performance data;

setting selected configurations for a new target server that is potentially included in the desired target server platform;

generating second performance data based on an aggregation of at least some of the first performance data with the time interval aggregation function;

marking each of the plurality of source servers with one of a first status, second status, and third status, wherein the first status indicates the marked source server is to be replaced in the server consolidation, the second status indicates the marked source server is to be reused in the server consolidation, and the third status indicates the marked source server is to be replaced or reused as necessary;

deriving, by the consolidation analysis module in the computer, a bin-packing solution to the server consolidation based at least on some of the first performance data, the second performance data, and the selected configurations for the new target server, wherein the bin-packing solution includes assigning each of the source servers to one of the target servers; and applying, by the computer, the bin-packing solution to provide the server consolidation service to the customer, including reporting the computed minimum number of the target servers and a consolidation assignment specifying the target servers that each of the source servers is assigned to.

16. The method of claim 15, further comprising:

computing, by the consolidation analysis module in the computer, a minimum number of target servers required to consolidate the plurality of source servers based at least on some of the first performance data, the second performance data, the selected configurations for the desired target server, and the multiple consolidation parameters.

17. A non-transitory computer-readable medium on which are encoded program codes for server consolidation, the program codes comprising:

program code for accessing first performance data of a plurality of source servers in a desired environment that are selected for server consolidation over a predetermined number of constant time intervals;

program code for receiving a selected performance capacity, for each of one or more predetermined performance metrics, and a selected corresponding probability goal, for reaching the performance capacity, for one or more desired target servers;

program code for receiving selected configurations for a new server that is potentially included in the one or more desired target servers;

program code for marking each of the plurality of source servers with one of a first status, second status, and third status, wherein the first status indicates the marked source server is to be replaced in the server consolidation, the second status indicates the marked source server is to be reused in the server consolidation, and the third status indicates the marked source server is to be replaced or reused as necessary;

program code for computing workload sizes on each of the plurality of source servers based at least on the first performance data;

program code for sorting the plurality of source servers in decreasing order of the workload sizes for listing in an object list;

program code for first sorting all servers in the plurality of source servers that are marked with the second status for listing in an existing-bin list;

program code for second sorting in decreasing order of processor speed of all servers in the plurality of source servers that are marked with the third status for listing in the existing-bin list after the first-sorted source servers with the second status;

program code for determining whether the first source server listed in the sorted object list and marked with the first status fits into a best server on the existing-bin list based on a predetermined criterion;

program code for deriving a bin-packing solution including assigning each of the source servers to one of the target servers; and program code for reporting the bin-packing solution, including reporting a consolidation assignment specifying the target servers that each of the source servers is assigned to.

18. The non-transitory computer-readable medium of claim 17, wherein the program code for deriving the bin-packing solution further comprises:

program code for assigning the listed first source server to the best server upon a determination that the listed first source server fits in the best server based on the predetermined criterion that the best server is any server on the existing-bin list that is capable of accommodating a workload of the listed first source server.

19. The non-transitory computer-readable medium of claim 17, the program code for determining based on the predetermined criterion includes:

program code for the predetermined criterion that the best server is the server that exhibits one of, highest capacity used after fitting the listed first source server;

lowest capacity used after fitting the listed first source server; and least capacity increment after fitting the listed first source server;

as based at least on the selected performance capacity and the corresponding probability goal for each of the one or more predetermined performance metrics.

* * * * *